United States Patent [19]

Strocker

[11] 3,908,837
[45] Sept. 30, 1975

[54] REMOVAL OF MATERIAL FROM BULK STORAGE
[75] Inventor: Gunter Strocker, Holzwickede, Germany
[73] Assignee: Gustav Schade Maschinenfabrik, Dortmund, Germany
[22] Filed: May 8, 1974
[21] Appl. No.: 467,929

[30] Foreign Application Priority Data
May 12, 1973 Germany............................ 2324058

[52] U.S. Cl.................................... 214/10; 105/144
[51] Int. Cl.² ........................................ B65G 65/28
[58] Field of Search... 214/17 DA, 17 DB, 10, 15 E; 198/36; 104/245, 247; 105/144, 146, 147

[56] References Cited
UNITED STATES PATENTS
3,618,744   11/1971   Hulette ................................ 198/36

FOREIGN PATENTS OR APPLICATIONS
1,240,244   7/1971   United Kingdom............ 214/17 DA
1,087,407   10/1967   United Kingdom............ 214/17 DA Primary Examiner—Robert G. Sheridan
Attorney, Agent, or Firm—Meyer, Tilberry & Body

[57] ABSTRACT

A gantry-less scraper device with a pivoted jib for the removal of material from a bulk storage dump having a dump delimiting wall at the machine side. The device travels along the machine side of the dump on a first rail spaced from the base of the delimiting wall and on a second rail on the side of the delimiting wall near its top. The device does not require a rail on the far side of the dump, does not require support from a shed over the dump, and does not require clearance for a counterweight.

9 Claims, 3 Drawing Figures

REMOVAL OF MATERIAL FROM BULK STORAGE

This invention relates to bulk storage dumps including dumps roofed over as bulk material silos and the like. The invention particularly relates to the removal of material from such dumps by a device having at least one pivoted jib and movable alongside the dump.

Various designs of device for removing materials from storage are known. Devices which travel along the length of a dump while removing material from storage may or may not have a gantry spanning the dump. Both types generally travel on rails.

Gantry-less devices require adequate space at the side of the dump for a track, and to obtain adequate stability the rails must be laid with a relatively broad gauge. Such gantry-less devices frequently have counterweights on the main part of the machine to counterbalance the pivoted jib resulting in a greater width of the machine and so requiring greater space at the side of the dump, which may not be available, particularly in the case of storage silos where the dump is covered over.

Gantry devices with a full gantry spanning the dump generally require space for rails at both sides of the dump. This space may not always be available, and in consequence it may be more advantageous to employ the so-called semi-portal or one legged construction wherein at one side the gantry is carried by a rail in the vicinity of the dump base but at the other side it is supported from a rail arranged on the roof or walls of the storage silo above the height of the crest of the dump. This necessitates a storage silo of greater rigidity and strength.

The object of this invention is to provide a construction requiring a track on only one side of the storage dump, but requiring only a relatively small amount of space at this side of the dump without requiring the shed structure of a silo to provide support for the scraper device.

A further object of this invention is to provide a gantry-less scraper device for the removal of material from storage which does not require a counterweight projecting from the machine on the opposite side to the pivoted jib. Another object of the invention is to provide a scraper device for the removal of material from bulk storage which is lighter and simpler in construction than known gantry devices.

A still further object of this invention is to provide a device for the removal of material from bulk storage which may be employed in already built sheds or silos without the useful cross section of the structure being excessively reduced in providing space for the machine and its track, and without the structure's walls or roof being required to provide support for the machine.

According to one aspect of this invention there is provided in a material removing device having a pivoted jib for the removal of material from a bulk storage dump and moveable relative to the dump, improved supporting means comprising wheel means adapted to travel on a first, lower, track beside one edge of said dump, and wheel means adapted to travel on a second track above said first track and between said first track and said dump of material. The term "wheel means" embraces one or more wheels, rollers or the like.

In a preferred construction there is provided in a material removing device according to claim 1 having a jib for the removal of material from a bulk storage dump, said dump having one edge defined by a dump delimiting wall, improved supporting means comprising wheel means adapted to travel on a first, lower, track beside and spaced from said dump delimiting wall, and wheel means adapted to travel on a second track above said first track, said second track being on or fast with said delimiting wall.

Preferably the device comprises a main section movable along said first and second tracks, and a jib pivoted thereto for movement about a horizontal axis. Preferably also the main section of the machine carries an upwardly projecting second jib, shorter than the said pivoted jib, and from which the said pivoted jib is suspended. It is preferred that the device is a scraper, and that the pivoted jib is a scraper jib.

According to another aspect of this invention bulk storage means, i.e. a bulk storage silo, site or the like is provided comprising a bulk storage dump, a dump delimiting wall, a first track beside and spaced from said dump delimiting wall and a second track above the first and on or fast with said dump delimiting wall, said tracks being adapted to support a material removing device as above. It is preferred that the first track is a rail, and that guide rollers on the scraper device travel at each side of this rail.

It will be appreciated that, in contradistinction to the situation with a full gantry machine, the supporting and guiding of the scraper device is effected exclusively from one side of the dump, termed the machine side, and no track has to be provided at the opposite side of the dump.

The second track may advantageously be arranged on a side face of the dump delimiting wall directly adjacent the top thereof. It is then preferred that the dump delimiting wall is buttressed on the side opposite the said second track. This can be effected for example with the aid of cross arm braces or by support from the ground when the storage yard floor has a ramp like design. The effect is that the forces opposing the tendency of the scraper device to tilt over are transmitted directly to the foundations or bed plate of the structure.

In order that the invention may be understood more readily, two embodiments will now be described with reference to the accompanying diagrammatic drawings, wherein.

Figure 1:
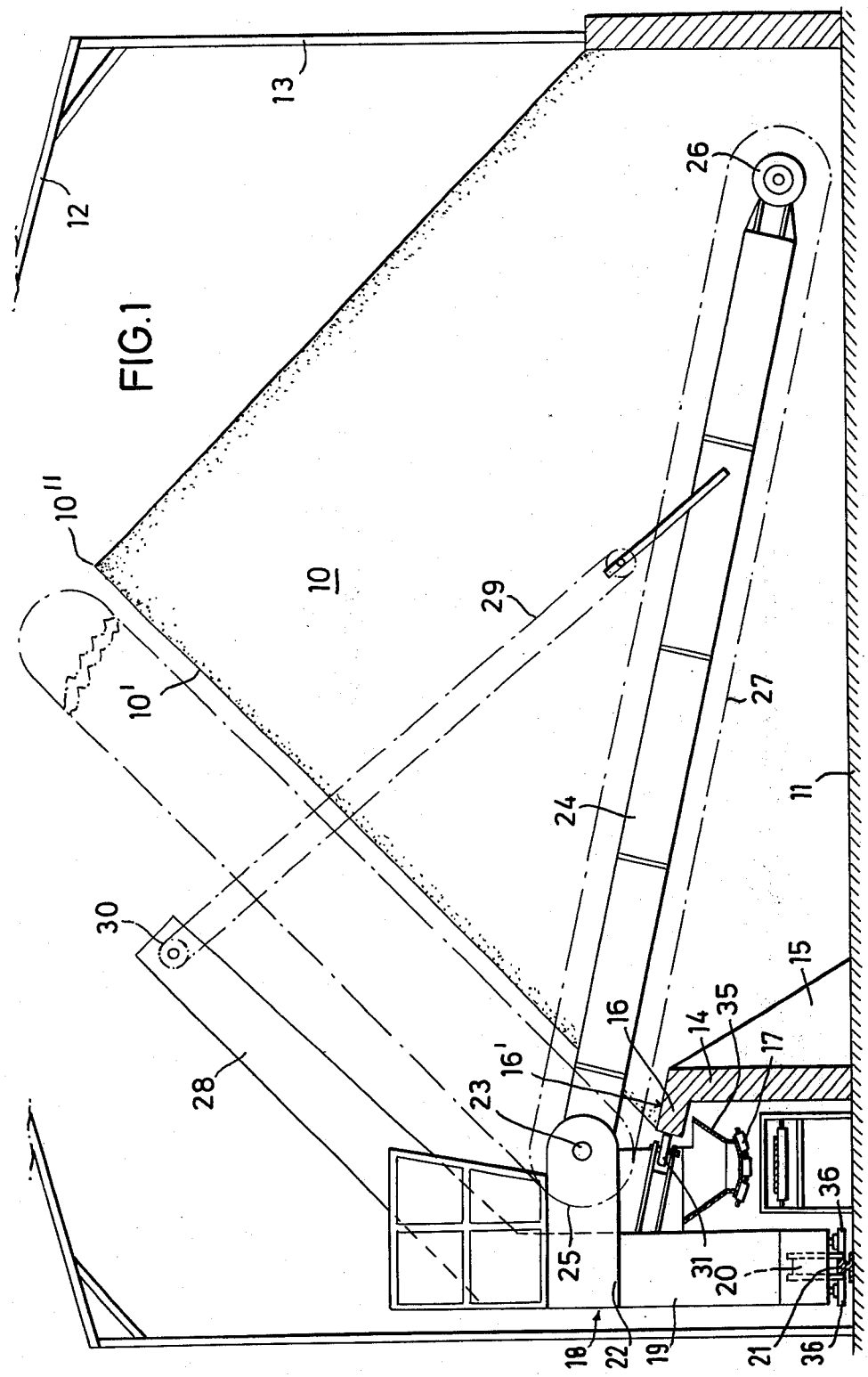
FIG. 1 is a side elevation of a scraper device and storage dump.

FIG. 1 shows a covered bulk material silo having a dump 10 which in cross section is triangular. Reference numeral 11 designates the concrete base 12 the roof structure and 13 the wall structure of the storage shed. Arranged on the machine side of the dump 10 is a dump delimiting wall 14 laterally delimiting the dump in the base zone and which is expediently of concrete construction and connected to the concrete base 11. At the inner or dump side, the dump delimiting wall 14 is buttressed by supports 15 bearing against the concrete base 11. The supports 15 may also be of concrete. The dump delimiting wall 14 has, at its head 16, a table-like or ramp-like head face 16' over which the bulk material slides as material is removed from storage. The bulk material falls onto the storage yard belt 17 on the machine side of the dump 10, at the outer side of the dump delimiting wall 14. The bulk material is removed from the dump zone via the storage yard belt 17. The scraper device for the removal of material from storage has a main section or machine frame 18 with a narrow supporting section 19 at the base of which there are mounted travel wheels 20 at least one of which is driven by the travel mechanism drive (not shown). The travel wheels 20 travel on a rail 21 disposed on the base 11 laterally adjacent to the storage yard belt 17 in the longitudinal direction of the dump 10. At the head of the main section 18 of the machine a jib 24, designed as a scraper is mounted in pivot bearings 23 having a horizontal pivot axis. The pivot bearings are disposed directly above the ramp-like head face 16' of the dump delimiting wall 14. The jib 24 comprises, in known manner, a box girder of welded construction having at both its ends sprocket wheels 25 and 26 carrying two endless, parallel roller-type chains 27 to which the scraper elements (not shown) are connected in known manner. The pivot axis of the driven sprocket wheels 25 coincides with the pivot axis 23 of the jib 24.

Also supported by the main section 18 of the machine is a jib 28 extending substantially parallel to the inclination of the dump slope 10'. The jib 24 is suspended from the jib 28 in known manner by a pulley block connected by rope 29 to a winch 30. Thus, with the aid of the winch 30, the jib 24 can be raised and lowered. The jib 28 is designed as a short jib and is substantially shorter than the removal from storage jib 24; thus, its free end is located below the dump crest 10'' and below the free end of the jib 24 when the latter is pivoted up into its highest lifting position (indicated by chain dotted lines).

Figure 2:
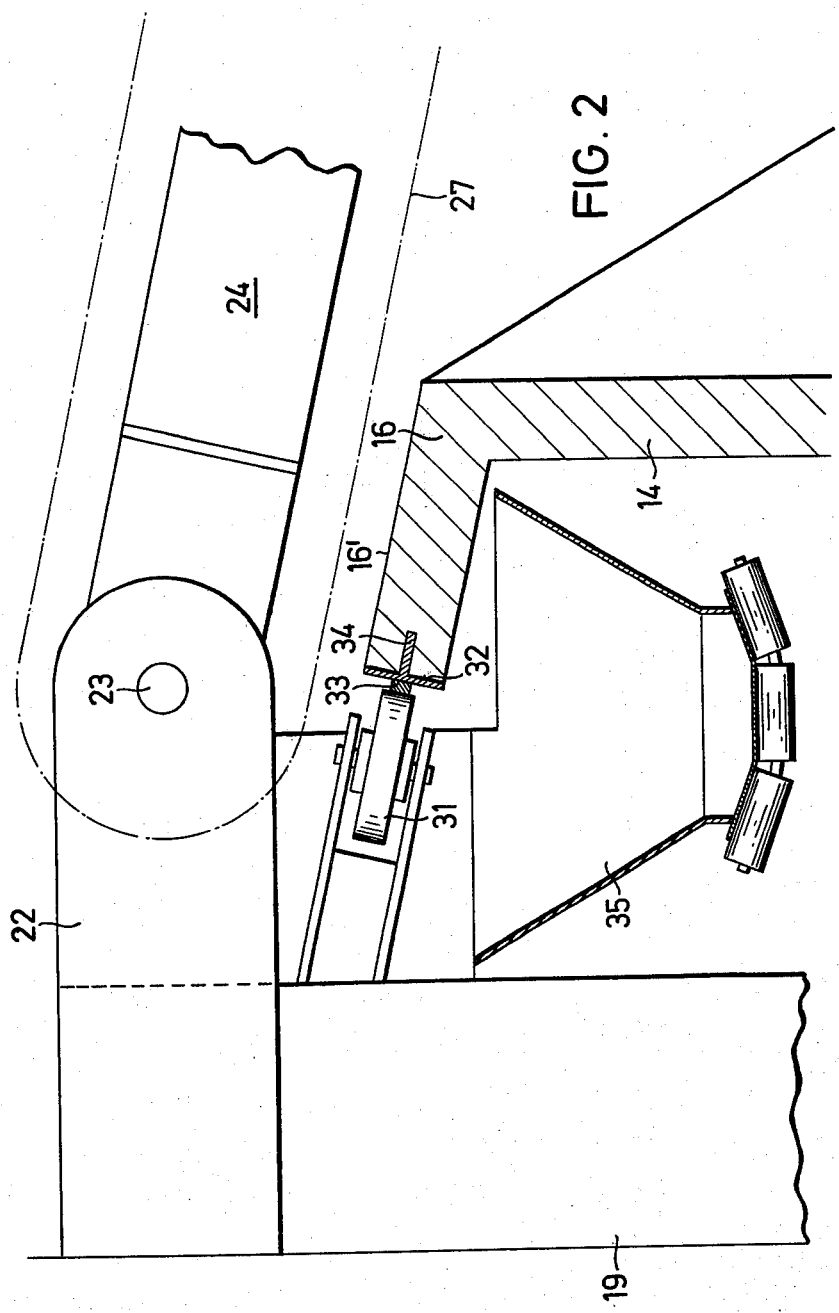
FIG. 2 is an enlarged side elevation showing the second or upper track.

Directly below the jib pivot bearing 23, travel rollers 31 are mounted to the main section 18 of the machine. These rollers 31 support the scraper device laterally from the delimiting wall 14. As best seen from FIG. 2, a flat rail 33 on which the rollers 31 travel is arranged at the lateral face 32 of the upper ramp-like element 16 of the dump delimiting wall 14. This rail 33 is anchored by means of a web 34 set into the concrete wall. Thus, the scraper device is supported on the one hand, through the travel wheels 20, on the lower rail 21 and on the other hand by its rollers 31 at the lateral guide rail 33 of the dump delimiting wall 14, the tilting forces derived from the jib weight being taken up by the dump delimiting wall and discharged to the concrete base 11. It will be perceived that the main section 18 of the machine of the scraper device can be constructed to be extremely narrow since the conventional counterweight can be dispensed with and therefore less space is required on the machine side of the dump. Supporting and guiding of the removal from storage device is effected exclusively on the machine side of the dump, so that no rail requires to be laid on the opposite dump side. Thus, the space spanned by the shed structure can be utilised in optimum manner for bulk material storage. With the elimination of the counterweight, there is achieved a considerable reduction in the total weight of the device.

As is conventional with such devices while removing material from storage the scraper device travels at continuous velocity along the dump 10 with the jib 24 lowered onto the dump slope 10' scraping the bulk material down the dump slope. The bulk material then passes via the ramp face 16' of the dump delimiting wall 14 and via a feed hopper 35 on the main section 18 of the machine onto the storage yard belt 17.

Arranged at the base of the supporting section 19 of the machine are lateral guiding rollers 36 rolling on the opposite lateral faces of the rail head. With this arrangement, a roller pair 36 is expediently associated with each travel wheel 20. As a rule, it suffices if only two travel wheels 20 are provided.

Figure 3:
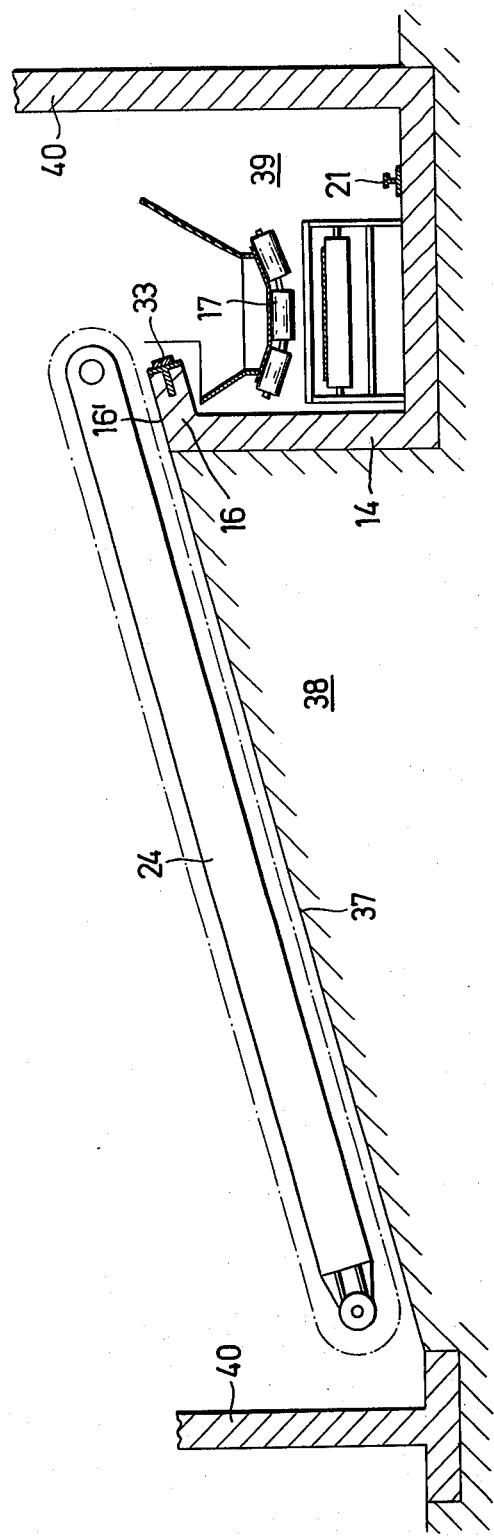
FIG. 3 is a side elevation showing a modification.

In the case of the modification shown in FIG. 3, the dump base is designed as a so-called ramp face 37. The concreted lateral delimiting wall 14 is here buttressed at the inner side by the built-up ground 38. The storage yard belt 17 is disposed in a concreted belt duct 39 in which also the rail 21 is disposed. Reference numeral 33 designates the rail, arranged at the lateral face of the head element 16 of the dump delimiting wall, for laterally supporting the removal from storage device. The elements 40 are the lower parts of the shed structure (not shown) erected over the dump. It will be perceived that in its lowermost position the jib 24 conveys the bulk material up the ramp face 37 and over the ramp-like head face 16' of the dump delimiting wall 14, onto the storage yard belt 17.

Having thus described my invention, I claim:

1. A material removing device for the removal of bulk material from a bulk storage dump, said dump being defined near its base by a dump delimiting wall having an inner and an outer face and a head face over which the bulk material is conveyed as it is removed from said dump, said device including a loader having a first jib pivotally mounted on a supporting means on said loader so as to be pivoted about a substantially horizontal pivot axis and extending over said dump; means for guiding and supporting said loader consisting of: a first track arranged adjacent the outer face of said dump delimiting wall below the head face thereof and a second track arranged above said first track on the outer face of said dump delimiting wall laterally below said head face; first wheel means on said loader traveling on said first track vertically and horizontally supporting said loader; second wheel means on said loader a distance above said first wheel means traveling on said second track and acting to laterally support said loader, thereby counteracting the tilting force of said loader created by the weight of said jib.

2. Device according to claim 1 wherein said second wheel means is mounted on said loader in a position under and in close proximity to said horizontal pivot axis of said pivoted jib.

3. Device according to claim 1 wherein said loader carries an upwardly projecting second jib, said second jib being shorter than the said first jib, and said first jib being suspended from said second jib.

4. The device according to claim 1 wherein said first wheel means travel on said first track and wherein the device has a pair of guide rollers one traveling at either side of said track.

5. The material removing device according to claim 1 wherein the loader is a scraper loader, and said first jib is a scraper jib.

6. Bulk storage means comprising a bulk storage dump, a dump delimiting wall having inner and outer faces and a material removing device moveable parallel to said wall and having a pivoted jib projecting over said wall and means for supporting and guiding said device consisting of: a first track beside and spaced from said outer face of said dump delimiting wall and a second track above said first track and on said dump delimiting wall and first and second wheel means on said device traveling on said first and second tracks respectively.

7. Bulk storage means according to claim 6 wherein the said dump delimiting wall has a side face directly adjacent its top, and the second track is on said side face.

8. Bulk storage means according to claim 7 wherein the dump delimiting wall is buttressed on said inner face.

9. Bulk storage means according to claim 7 having a conveyor between the first track and said outer face of said delimiting wall for the removal of material scraped from the dump.

* * * * *